(12) United States Patent
Lei

(10) Patent No.: US 9,206,825 B2
(45) Date of Patent: Dec. 8, 2015

(54) CONNECTING STRUCTURE

(71) Applicant: Zhongshan Broad-Ocean Motor Manufacturing Co., Ltd., Zhongshan (CN)

(72) Inventor: Wei Lei, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 269 days.

(21) Appl. No.: 13/844,647

(22) Filed: Mar. 15, 2013

(65) Prior Publication Data
US 2014/0037370 A1 Feb. 6, 2014

(30) Foreign Application Priority Data

Jul. 31, 2012 (CN) ...................... 2012 2 0376882 U

(51) Int. Cl.
| | | |
|---|---|---|
| *B64C 11/02* | (2006.01) | |
| *F16B 7/18* | (2006.01) | |
| *F16D 1/00* | (2006.01) | |
| *F16D 1/08* | (2006.01) | |
| *F16D 1/06* | (2006.01) | |

(52) U.S. Cl.
CPC ... *F16B 7/18* (2013.01); *F16D 1/00* (2013.01); *F16D 1/0835* (2013.01); *F16D 2001/062* (2013.01); *Y10T 403/3986* (2015.01); *Y10T 403/4637* (2015.01); *Y10T 403/57* (2015.01); *Y10T 403/7047* (2015.01)

(58) Field of Classification Search
USPC ......... 403/192, 200, 230, 243, 244, 263, 361, 403/365, 371, 300; 416/134 R, 144, 196 A, 416/196 R, 204 R; 415/111, 113, 141, 415/229–231; 290/44, 55
See application file for complete search history.

(56) References Cited

U.S. PATENT DOCUMENTS

| | | | | |
|---|---|---|---|---|
| 1,490,080 | A * | 4/1924 | Austin | .......................... 403/268 |
| 2,861,851 | A * | 11/1958 | Young | ............................ 403/361 |
| 2,974,984 | A * | 3/1961 | Koch | ............................. 403/225 |
| 3,797,661 | A * | 3/1974 | Buzga | ............................. 34/371 |
| 6,948,913 | B2 * | 9/2005 | Heyes et al. | .............. 416/204 R |
| 7,374,402 | B2 * | 5/2008 | Thiele et al. | .............. 416/204 R |
| 2002/0122724 | A1 * | 9/2002 | Tseng | ........................... 416/175 |

* cited by examiner

*Primary Examiner* — Josh Skroupa
(74) *Attorney, Agent, or Firm* — Matthias Scholl P.C.; Matthias Scholl

(57) ABSTRACT

A connecting structure for use between a wind wheel of a blower and a motor shaft in combination with the wind wheel (1) and the connecting structure including a shaft sleeve (3). The wind wheel (1) includes a bottom plate (11), and the bottom plate (11) is convex to form a sleeve cover (12). A bottom surface and a side surface of the shaft sleeve (3) is wrapped by the sleeve cover (12). A thread (21) is arranged on an end of the shaft (2). A shaft step (22) is arranged on the shaft (2) at an inner side of the thread (21). The thread (21) arranged on the end of the shaft (2) is inserted into a threaded hole (31) arranged inside the shaft sleeve (3). The shaft step (22) is attached to a top surface of the shaft sleeve.

7 Claims, 8 Drawing Sheets

CONNECTING STRUCTURE

CROSS-REFERENCE TO RELATED APPLICATIONS

Pursuant to 35 U.S.C. §119 and the Paris Convention Treaty, this application claims the benefit of Chinese Patent Application No. 201220376882.8 filed Jul. 31, 2012, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a connecting structure between a wind wheel of a blower and a motor shaft.

2. Description of the Related Art

A typical connecting structure between a wind wheel of a blower and a shaft, includes: a wind wheel, a shaft, and a shaft sleeve. The shaft sleeve is arranged inside the wind wheel by injection molding. A connection between the shaft and the wind wheel is realized by screwing a thread disposed on an end part of the shaft into a threaded hole disposed on the shaft sleeve. However, this structure is disadvantages in that during the connecting installation between the shaft and the wind wheel, the shaft is prone to slant, which results in vibrations of the wind wheel in operation, and it is difficult to correct the dynamic balance.

SUMMARY OF THE INVENTION

In view of the above-described problems, it is one objective of the invention to provide a connecting structure between a wind wheel of a blower and a motor shaft that has a simple structure, and easy installation procedure. The connecting structure assures that the shaft is perpendicular to the wind wheel and solves the vibration problem of the wind wheel.

To achieve the above objective, in accordance with one embodiment of the invention, there is provided a connecting structure between a wind wheel of a blower and a motor shaft, comprising: the wind wheel, the wind wheel comprising a bottom plate comprising a sleeve cover; the shaft, the shaft comprising an end comprising a thread; and a shaft sleeve, the shaft sleeve comprising a bottom surface, a side surface, and a top surface. The bottom plate is convex to form the sleeve cover. The bottom surface and the side surface of the shaft sleeve are wrapped by the sleeve cover. A shaft step is disposed on the shaft at an inner side of the thread. The shaft sleeve comprises a threaded hole. The thread arranged on the end of the shaft is inserted into the threaded hole of the shaft sleeve. The shaft step is attached to the top surface of the shaft sleeve.

In a class of this embodiment, the shaft is convex to form a boss between the thread and the shaft step. The boss is attached to an inner wall of the shaft sleeve outside the threaded hole.

In a class of this embodiment, a groove is arranged on an outer surface of the shaft sleeve; and the sleeve cover stretches into the groove.

In a class of this embodiment, a step is arranged on a bottom of the outer surface of the shaft sleeve. The sleeve cover stretches into the step.

In a class of this embodiment, the bottom plate is convex to form a plurality of arc-shaped wind blades. An air channel is formed between two adjacent wind blades. The wind blade comprises an end surface, and a top plate is disposed on the end surface of the wind blade. An air inlet is disposed on a middle part of the top plate. The air flows into the air channel from the air inlet, and flows out between the top plate and the bottom plate.

In a class of this embodiment, the bottom plate is convex downward to form a plurality of small blades; and the small blades are evenly distributed on a bottom surface of the bottom plate.

In a class of this embodiment, a plurality of convex blocks are disposed on the bottom plate for correcting a dynamic balance.

In a class of this embodiment, the shaft sleeve and the bottom plate are integrated by injection molding.

Advantages of the invention are summarized as follows:

1) The shaft step is arranged on the shaft; the thread disposed on the end of the shaft is screwed into the threaded hole of the shaft sleeve, so that the shaft step is attached to the top surface of the shaft sleeve, and the vibration problem of the shaft of the wind wheel in axial direction is solved.

2) The shaft is convex to form the boss between the thread and the shaft step. The boss is attached to the inner wall of the shaft sleeve outside the threaded hole, thereby solving the vibration problem of the wind wheel in peripheral direction and keeping the shaft being perpendicular to the wind wheel.

3) The groove is arranged on the outer surface of the shaft sleeve; and the sleeve cover stretches into the groove. The shaft sleeve has an even quality, thereby assuring the dynamic balance of the wind wheel. Furthermore, the sleeve cover stretches into the groove to keep a firm connection, so that the shaft sleeve cannot loose;

4) The step is arranged on the bottom of the outer surface of the shaft sleeve. The sleeve cover stretches into the step. Thus, the shaft sleeve is locked and fastened by the sleeve cover, 5) The bottom plate is convex downward to form the small blades; and the small blades are evenly distributed on the bottom surface of the bottom plate, thereby increasing the air volume.

6) A plurality of convex blocks are disposed on the bottom plate for correcting the dynamic balance; the dynamic balance is corrected by decreasing the convex blocks.

DETAILED DESCRIPTION OF THE EMBODIMENTS

For further illustrating the invention, experiments detailing a connecting structure between a wind wheel of a blower and a motor shaft are described below combined with the drawings.

Example 1

Figure 1:
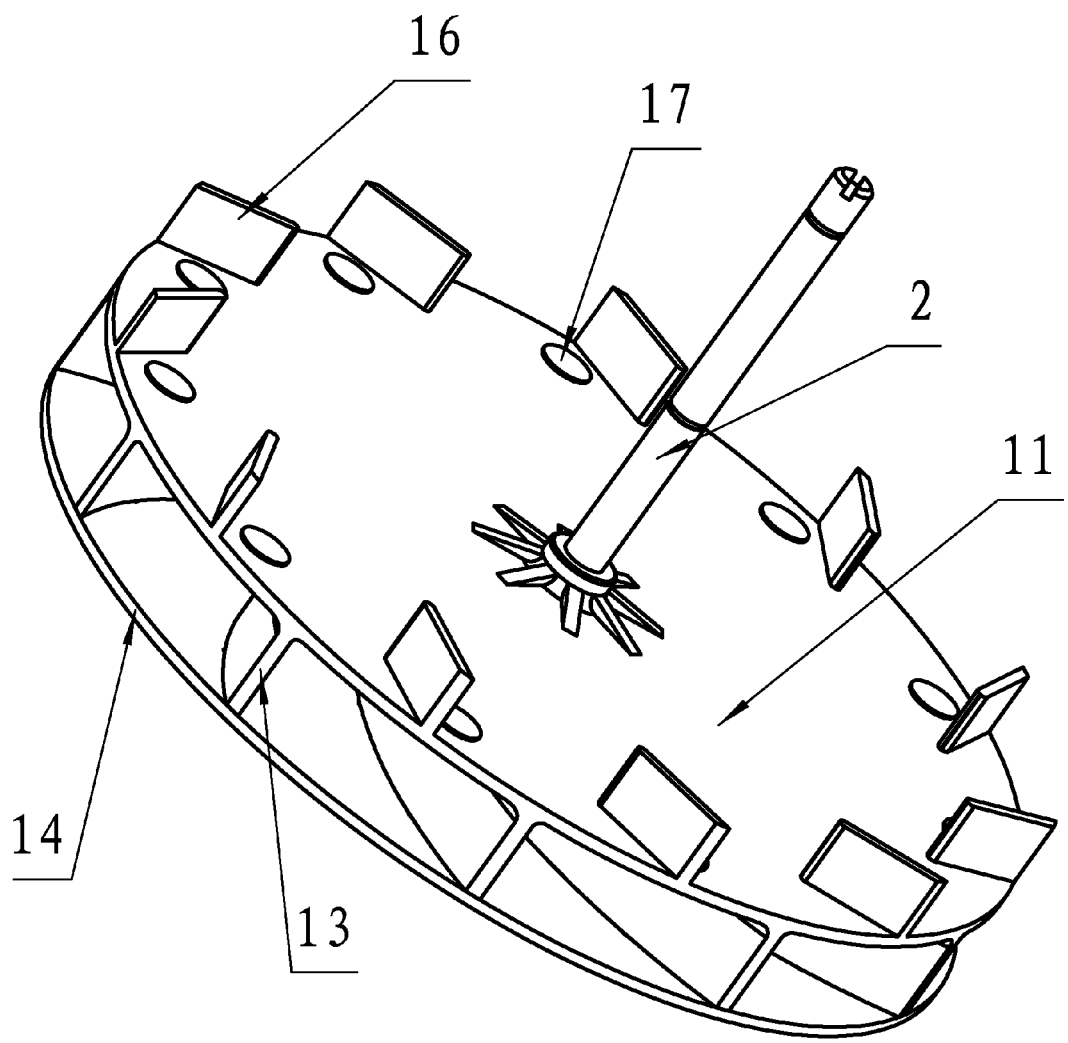
FIG. 1 is an assembly stereogram of a shaft and a wind wheel of the invention.
Figure 2:
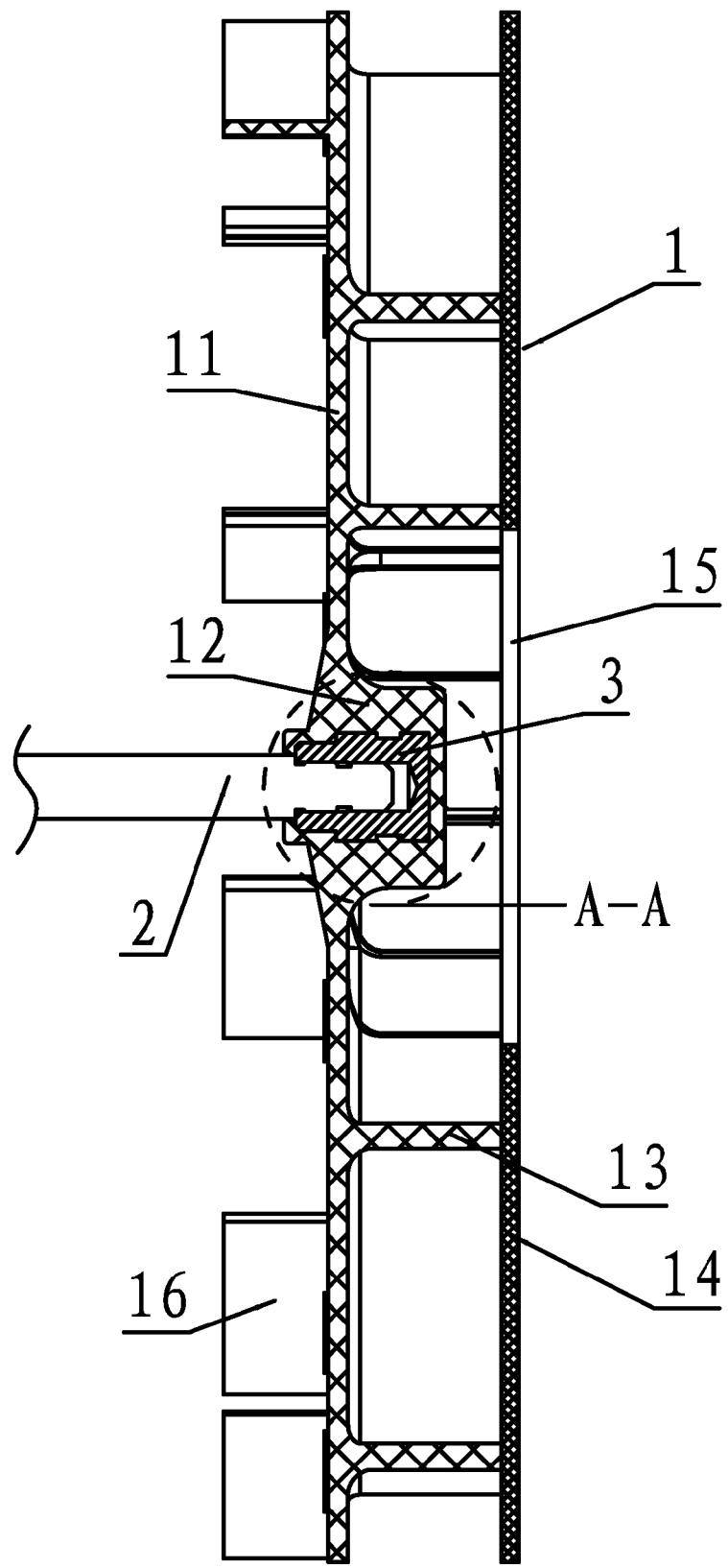
FIG. 2 is an assembly cutaway view of a shaft and a wind wheel of the invention.
Figure 3:
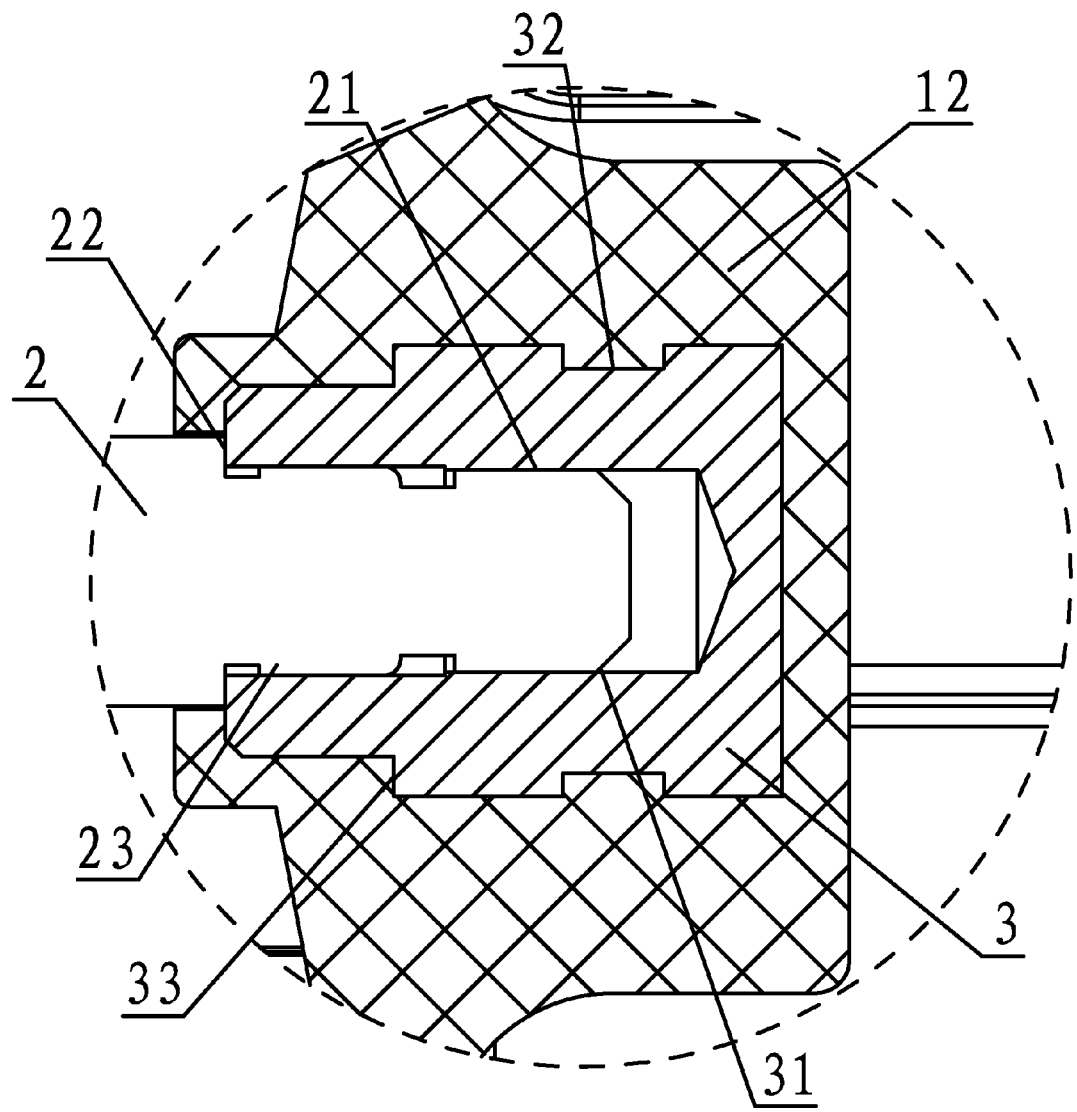
FIG. 3 is an enlarged view taken from part A-A of FIG. 2.

As shown in FIGS. 1-3, a connecting structure between a wind wheel of a blower and a motor shaft, comprises: the wind wheel 1, the shaft 2, and a shaft sleeve 3. The wind wheel 1 comprises a bottom plate 11, and the bottom plate 11 is convex to form a sleeve cover 12. A bottom surface and a side surface of the shaft sleeve 3 is wrapped by the sleeve cover 12. A thread 21 is arranged on an end of the shaft 2. A shaft step 22 is arranged on the shaft 2 at an inner side of the thread 21. The thread 21 arranged on the end of the shaft 2 is inserted into a threaded hole 31 arranged inside the shaft sleeve 3. The shaft step 22 is attached to a top surface of the shaft sleeve.

Example 2

Based on Example 1, the following technical features are added: the shaft 2 is convex to form a boss 23 between the thread 21 and the shaft step 22. The boss 23 is attached to an inner wall of the shaft sleeve 3 outside the threaded hole 31.

Example 3

Based on Example 1 or 2, the following technical features are added: a groove 32 is arranged on an outer surface of the shaft sleeve 3. The sleeve cover 12 stretches into the groove 32.

Example 4

Based on Example 3, the following technical features are added: a step 33 is arranged on a bottom of the outer surface of the shaft sleeve 3. The sleeve cover 12 stretches into the step 33.

Example 5

Based on Example 1, the following technical features are added: the bottom plate 11 is convex to form a plurality of arc-shaped wind blades 13. An air channel is formed between two adjacent wind blades 13. The wind blade 13 comprises an end surface, and a top plate 14 is disposed on the end surface of the wind blade 13. An air inlet 15 is disposed on a middle part of the top plate 14. The air flows into the air channel from the air inlet 15, and flows out between the top plate 14 and the bottom plate 11.

Example 6

Based on Example 1, the following technical features are added: the bottom plate 11 is convex downward to form a plurality of small blades 16, and the small blades are evenly distributed on a bottom surface of the bottom plate 11.

Example 7

Based on Example 1, the following technical features are added: a plurality of convex blocks 17 are disposed on the bottom plate 11 for correcting a dynamic balance.

Example 8

Based on Example 1, the following technical features are added: the shaft sleeve 3 and the bottom plate 11 are integrated by injection molding.

As the application belongs to the machinery field, the common technicians of the field can easily figure out a new technical scheme by combining the technical scheme of Example 1 with a free combination of the added technical features mentioned in Example 2, Example 3, Example 4, Example 5, Example 6, Example 7 and Example 8.

Figure 6:
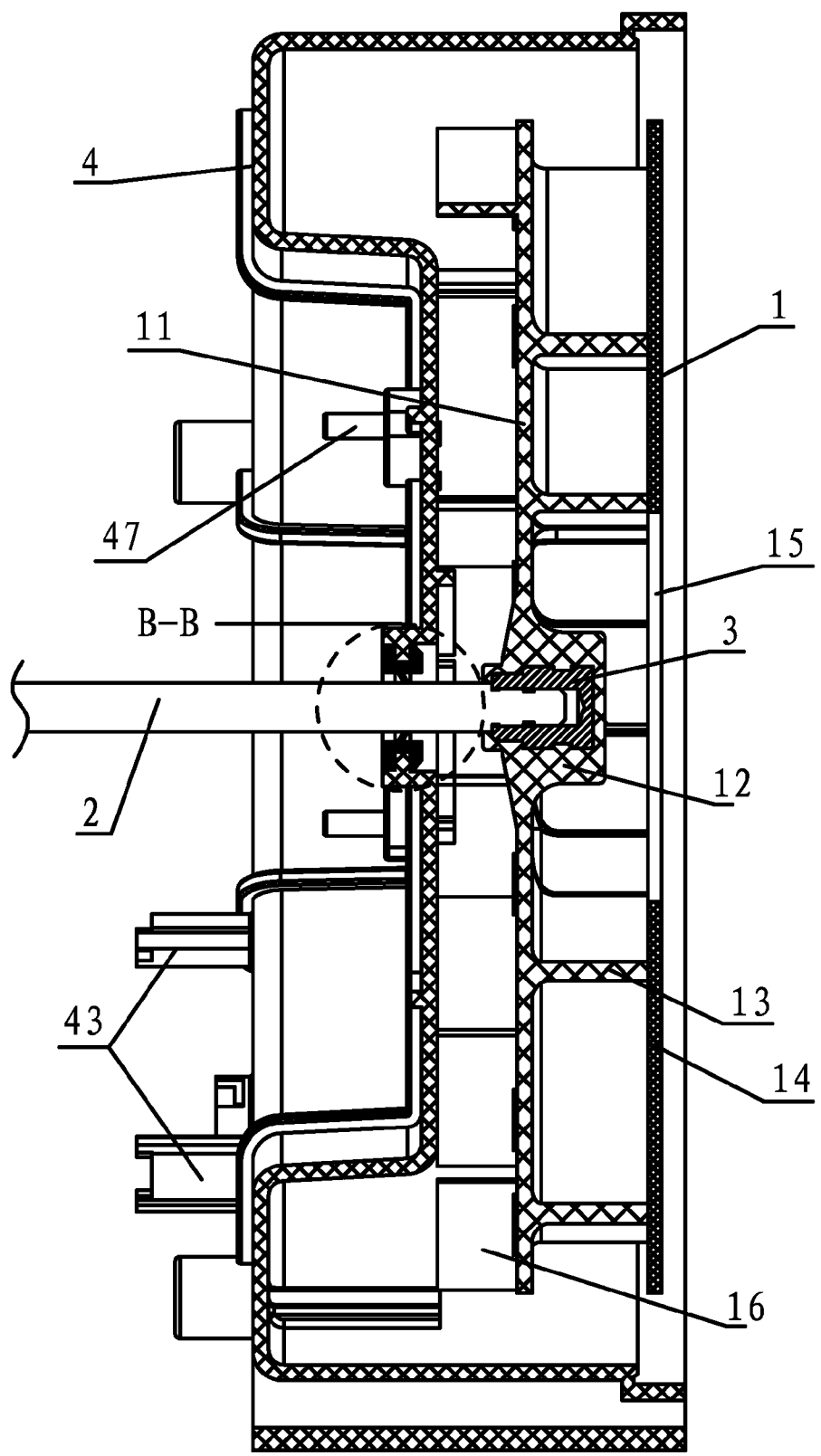
FIG. 6 is a cutaway view of a volute and a wind wheel of the invention.
Figure 7:
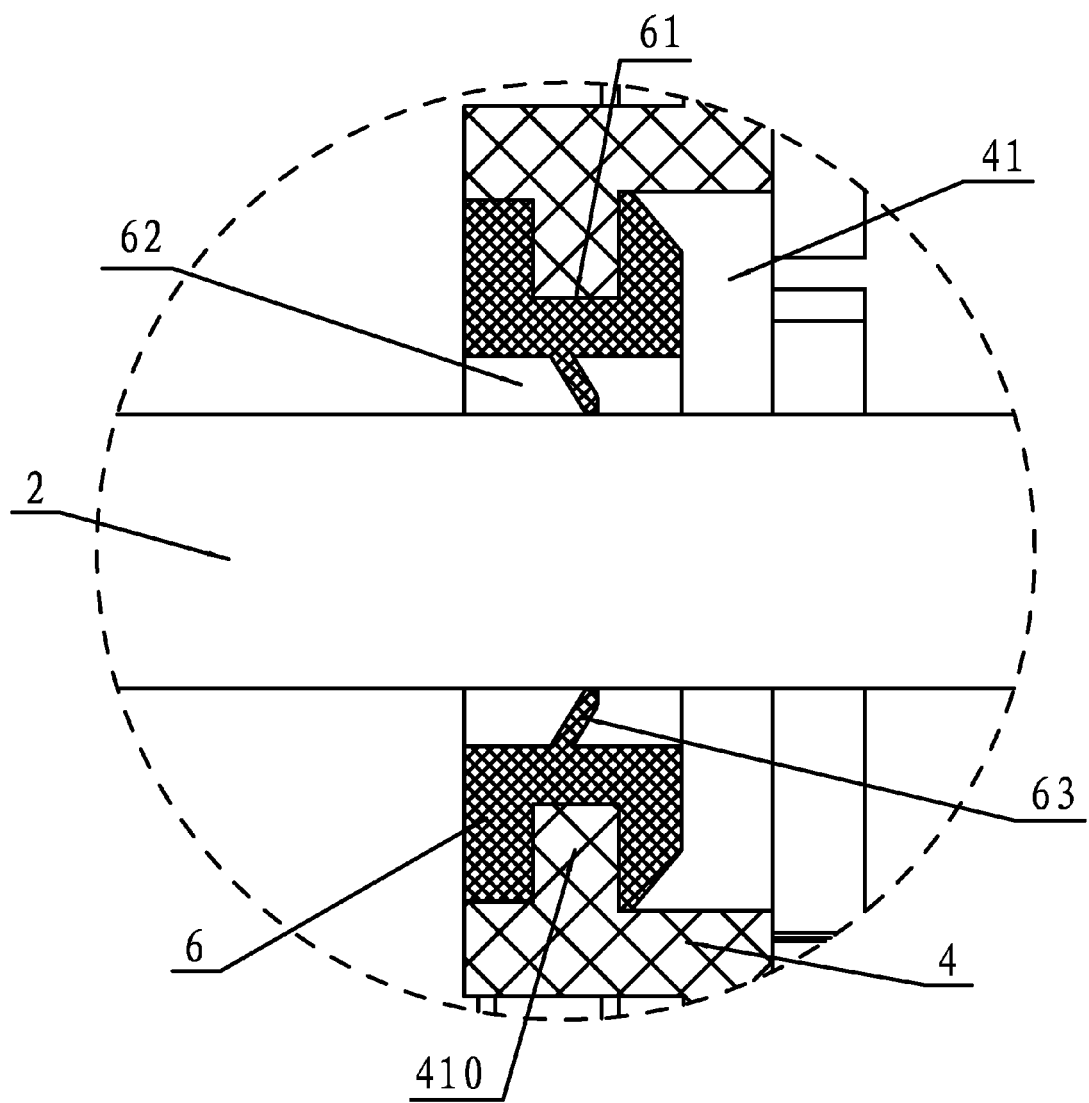
FIG. 7 is an enlarged view of part B-B of FIG. 6.

As shown in FIG. 6 and FIG. 7, the wind wheel 1 of the invention is arranged in a volute 4. A through hole 41 is arranged on a top of the volute 4. An annular boss 410 is disposed on an inner wall of the through hole 41. The shaft 2 passes through the through hole 41 and is connected to the wind wheel 1. A seal ring 6 is disposed on the volute 4 at a position of the through hole 41. An annular groove 61 is disposed on an outer surface of the seal ring 6. The annular boss 410 matches with the annular groove 61. A center hole 62 is arranged in the middle of the seal ring 6. An annular flange 63 is arranged on a middle part of an inner wall of the center hole 62. The shaft 2 passes through the center hole 62, and the annular flange 63 leans against the shaft 2.

Figure 4:
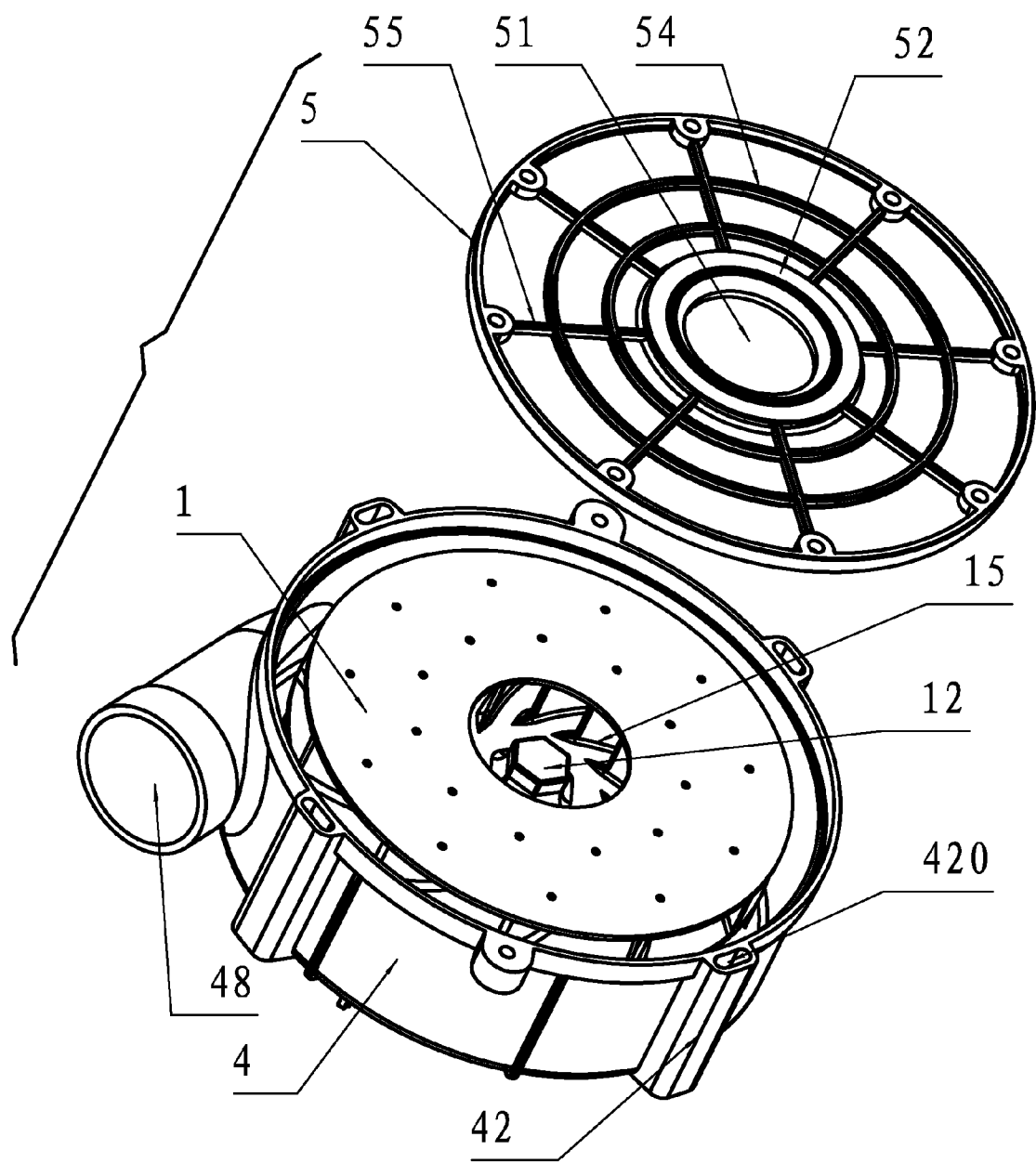
FIG. 4 is an assembly stereogram of a volute and a wind wheel of the invention.
Figure 5:
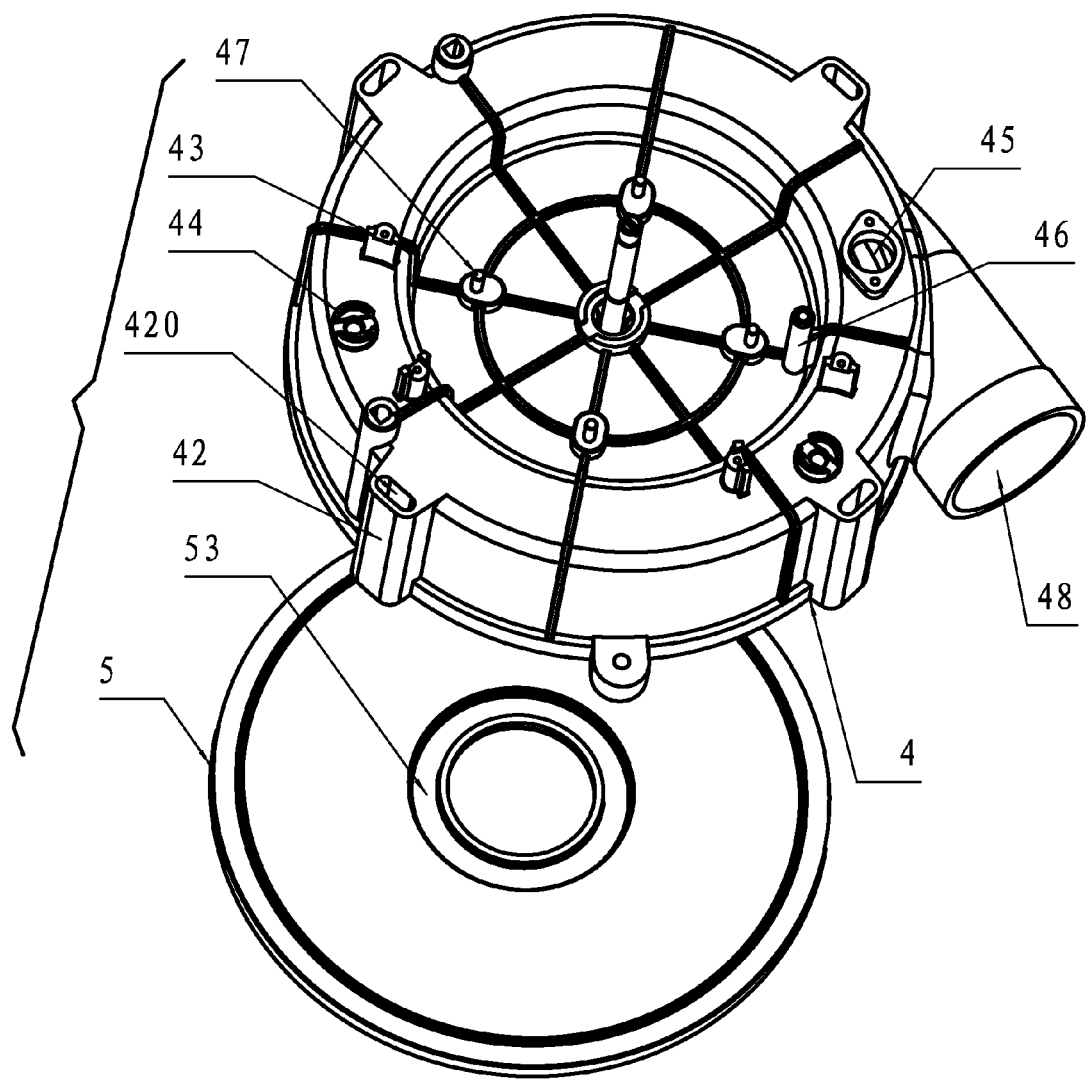
FIG. 5 is an assembly stereogram of a volute and a wind wheel of the invention in another angle.

As shown in FIGS. 4-6, a plurality of lugs 42 comprising a O-shaped through hole 420 are arranged on a sidewall of the volute 4 for installation. A plurality of mounting columns 43 with every two as a group are arranged on a top surface of the volute 4 on an inner side of the lugs 42. An air switch is disposed on the mounting columns 43. A boss 44 comprising a recess in a middle part is arranged on the volute 4 between two mounting columns 43. An air pipe protruding from the air switch is disposed on a bottom of the recess of the boss 44. A mounting hole 45 is arranged on the volute 4 for installing a temperature switch. The mounting hole 45 is a through hole. A manometric interface 46 is disposed on a sunken step of a middle of the top of the volute 4. A through hole is disposed in a middle of the manometric interface 46 to communicate with an inner side of the volute. A mounting screw 47 is arranged on a bottom of the sunken part of the top of the volute 4 by injection molding. The volute 4 is connected to the motor by the mounting screw 47. An air outlet 48 is disposed on the volute 4.

Figure 8:
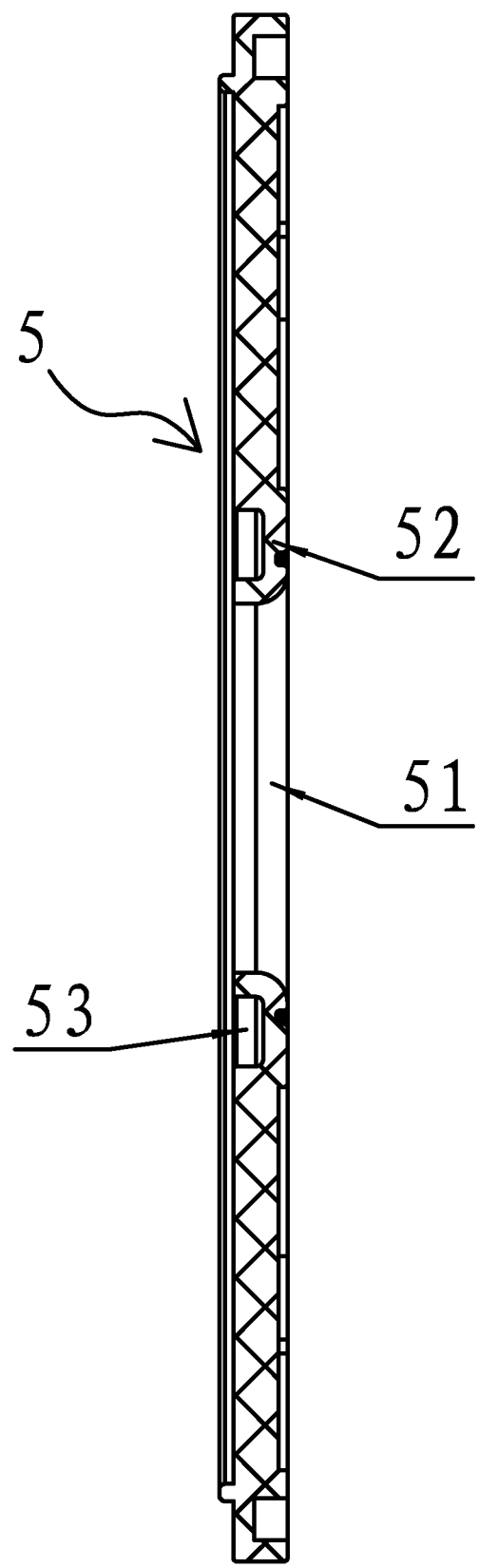
FIG. 8 is a cutaway view of a cover plate of the invention.

As shown in FIGS. 4, 5, and 8, a cover plate 5 is installed on the volute 4. An air-inlet hole 51 is formed in a central part of the cover plate 5. A boss 52 is arranged on the cover plate surrounding the air-inlet hole 51. A groove 53 is disposed on an end surface of the boss 52. A plurality of annular ribs 54 and radial ribs 55 are disposed on an outer end surface of the cover plate 5 surrounding the boss 52. The outer end surface of the cover plate is plane.

The invention is mainly to solve the vibration problem of the wind wheel. The shaft step 22 is arranged on the shaft 2; the thread disposed on the end of the shaft 2 is screwed into the threaded hole 31 of the shaft sleeve 3, so that the shaft step 22 is attached to the top surface of the shaft sleeve 3, and the vibration problem of the shaft of the wind wheel in axial direction is solved. Furthermore, the boss 23 arranged on the shaft 2 is attached to the inner wall of the shaft sleeve outside the thread hole 31, thereby solving the vibration problem of the wind wheel in peripheral direction and keeping the shaft being perpendicular to the wind wheel.

The invention claimed is:

1. A connection between a wind wheel of a blower and a motor shaft, the connection comprising:
    a wind wheel comprising a bottom wheel plate having a sleeve cover;
    a motor shaft comprising a threaded end having a first shaft part and a second shaft part; said first shaft part having an outer shaft surface, a shaft thread, and a shaft boss; and said second shaft part having a shaft step; and
    a shaft sleeve comprising a base sleeve plate, a cylindrical sleeve sidewall, and a sleeve hole; said cylindrical sleeve sidewall having a bottom sleeve surface, a top sleeve surface, an outer side sleeve surface, and an inner side sleeve surface; and
said inner side sleeve surface having a sleeve thread;
wherein:
    said sleeve cover is projected from said bottom wheel plate;
    said base sleeve plate and said outer side sleeve surface are wrapped by the said sleeve cover;
    said cylindrical sleeve sidewall extends from said base sleeve plate;
    said bottom sleeve surface is connected to said base sleeve plate;
    said top sleeve surface is disposed opposite to said bottom sleeve surface;
    said outer side sleeve surface extends from said bottom sleeve surface to said top sleeve surface;
    said inner side sleeve surface extends from said bottom sleeve surface to said top sleeve surface;
    said sleeve hole is confined by said base sleeve plate and said inner side sleeve surface;
    said first shaft part is inserted in said sleeve hole;
    said second shaft part is disposed outside of said sleeve hole;
    said shaft thread and said shaft boss are disposed on said outer shaft surface;
    said shaft step radially extends outward relative to said outer shaft surface;
    said shaft boss is disposed between said shaft thread and said shaft step;
    said shaft thread cooperates with said sleeve thread;
    said shaft step directly abuts against said top sleeve surface; and
    said shaft boss directly abuts against said inner side sleeve surface.

2. The connection of claim 1, wherein:
    a groove is arranged on said outer side sleeve surface; and said sleeve cover stretches into said groove.

3. The connection of claim 2, wherein a step is arranged on said outer side sleeve surface; and said step stretches into said sleeve cover.

4. The connection of claim 1, wherein:
    a plurality of arc-shaped wind blades is formed on said bottom wheel plate;
    an air channel is formed between two adjacent said wind blades;
    each of said wind blades comprises an end surface, and a top wheel plate is disposed on the end surface of each of said wind blades; and
    an air inlet is disposed on a middle part of said top wheel plate; and
when in use, air flows into said air channel from said air inlet, and flows out from between said top wheel plate and said bottom wheel plate.

5. The connection of claim 1, wherein a plurality of small blades is evenly distributed on a bottom surface of said bottom wheel plate.

6. The connection of claim 1, wherein a plurality of convex blocks is disposed on said bottom wheel plate for correcting a dynamic balance.

7. The connection of claim 1, wherein said shaft sleeve and said bottom wheel plate are integrated by injection molding.

* * * * *